United States Patent [19]
Adur et al.

[11] Patent Number: 6,007,902
[45] Date of Patent: Dec. 28, 1999

[54] MULTI-LAYER STRUCTURE WITH HEAT STABLE HIGH BARRIER POLYMER, METHOD THEREFOR AND PRODUCT THEREFROM

[75] Inventors: Ashok Adur, Ramsey, N.J.; Raymond Volpe, Weathersfield, Conn.; Thomas Z. Fu, Croton, N.Y.

[73] Assignee: International Paper Company, Tuxedo Park, N.Y.

[21] Appl. No.: 08/912,824

[22] Filed: Aug. 19, 1997

[51] Int. Cl.⁶ .................. C09K 19/00; B32B 27/36
[52] U.S. Cl. ............. 428/219; 428/537.5; 428/514; 428/479.6; 428/34.2; 264/469; 264/80; 264/135; 427/536; 427/223; 427/411; 156/82; 156/272.6; 156/314; 156/244.11
[58] Field of Search ............... 428/1, 34.2, 35.7, 428/36.6, 36.91, 480, 483, 515, 481, 1.1, 1.25, 1.33, 1.54, 1.6, 537.5, 514, 479.6, 219; 426/127; 206/524.1; 156/244.11, 244.13

[56] References Cited

U.S. PATENT DOCUMENTS

| | | |
|---|---|---|
| 5,145,546 | 9/1992 | Yuasa et al. .................. 156/234 |
| 5,248,530 | 9/1993 | Jester et al. .................. 428/1 |
| 5,288,529 | 2/1994 | Harvey et al. ................ 428/1 |
| 5,364,669 | 11/1994 | Sumida et al. ............... 428/1 |
| 5,405,565 | 4/1995 | Sumida et al. ............... 264/171 |
| 5,410,135 | 4/1995 | Pollart et al. ............... 219/730 |
| 5,516,474 | 5/1996 | Cloeren ...................... 264/171.23 |
| 5,589,236 | 12/1996 | Harvey et al. ................ 428/1 |
| 5,817,384 | 10/1998 | Furuta et al. ................ 428/1 |
| 5,843,501 | 12/1998 | Rubin et al. ................. 426/127 |
| 5,843,539 | 12/1998 | Harvey et al. ................ 428/1 |

Primary Examiner—Ellis Robinson
Assistant Examiner—John Figueroa
Attorney, Agent, or Firm—Michael J. Doyle; Stewart L. Gitler

[57] ABSTRACT

A substrate coated with a liquid crystal polymer with an intervening tie layer. A second embodiment provides a surface layer disposed on the LCP layer, sandwiching the LCP layer between the surface layer and the substrate. Methods for constructing the above also is provided.

19 Claims, 5 Drawing Sheets

MULTI-LAYER STRUCTURE WITH HEAT STABLE HIGH BARRIER POLYMER, METHOD THEREFOR AND PRODUCT THEREFROM

BACKGROUND OF THE INVENTION

1. FIELD OF THE INVENTION

This invention relates to the field of polymer layers, particularly thermotropic liquid crystalline polymer layers.

2. DESCRIPTION OF THE PRIOR ART

The diversity of articles packaged and shipped around the globe has stimulated demand for packaging materials which provide specially-tailored performance characteristics. Some of the characteristics include strength, elasticity, resilience, adhesiveness, transparency, electro-conductivity, light-shielding, gas-barrier, heat resistance and chemical resistance. In order to achieve any one or combination of these characteristics, typically, a variety of constituent polymers thereof must be carefully balanced and tuned.

The present invention employs a layer of liquid crystal polymer (LCP) which provides a significant number of the above-desired characteristics. Specifically, LCP is well known for its dimensional stability, heat resistance, chemical stability and electrical conductive properties. LCP also has been discovered to perform as an excellent barrier to various vapors and liquids, often essential for many packaging applications. LCP offers many significant properties over other classes of polymers. First, LCP has oxygen barrier properties equal to or better than ethylene vinyl alcohol copolymer (EVOH). For example, LCP oxygen permeability at 100% RH and 23° C. is 0.045 cc-mil/100 in$^2$-day-atm, 24 times better than that for an EVOH barrier made from EVALCA®. Typically, LCP has a moisture permeability at 90–100% RH of 0.07 g.mil/100 in$^2$-day-atm, versus 1 g.mil/100 in$^2$-day-atm for low density polyethylene (LDPE). Second, LCP has a temperature and humidity insensitive water vapor transmission rate (WVTR) several times better than EVOH and comparable to that of polyethylene at high temperatures. Third, LCP can sustain continuous service at temperatures above 200° C. Fourth, LCP has a low coefficient of thermal expansion, thus minimizing potential for board warp. Fifth, LCP has excellent chemical resistance to solvents, acids, bases and oils. LCP is resistant to most solvents even at moderate to elevated temperatures ranging from 150–200° C. LCP is stable when exposed to steam and hot water for extended periods of time. LCP is resistant to most to strong acids and mild bases at temperatures ranging from 50–100° C. LCP also exhibits excellent resistance when exposed to gamma radiation. Sixth, LCP delivers excellent retention of aromas and flavors. Seventh, LCP has excellent resistance to surface staining. Eighth, LCP provides excellent mechanical strength, much higher than EVOH or nylon. Ninth, LCP exhibits excellent heat degradation resistance, both in solid and melt state.

LCPs fall into a class of high-performance thermotropic plastic materials which have very rigid, rod-like molecules and are highly ordered in both the melt and solid state. In the melt state, LCP flows easily and may be processed with almost all techniques commonly associated with thermoplastics. LCP offers the advantage of low processing temperatures ranging from 550–650° F. In some cases, however, special processing equipment may be necessary. The rod-like nature of LCP molecules results in a profile of molecular orientation that resembles the physical orientation of the fibers in a reinforced thermoplastic. This flow behavior causes a self reinforcing effect that results in exceptional flexural strength and modulus, as well as good tensile performance, that improves bulge resistance.

LCP is a well-known material that has been used in many diverse applications, but not as a stand-alone barrier layer or in conjunction with a simple tie layer on a substrate. For example, in U.S. Pat. No. 5,248,530, issued Sep. 28, 1993, to Jester et al., a co-extruded first LCP layer is laminated to a second LCP layer having a lower melting temperature. The second LCP layer serves as a tie layer so that the composite layer may be bonded to another material.

U.S. Pat. No. 5,364,669, issued Nov. 15, 1994, to Sumida et al., describes a composite film comprising an LCP layer and a thermoplastic polymer layer laminated thereto. Similar to the Jester et al. invention, the thermoplastic layer of Sumida et al. functions as a complex tie layer.

U.S. Pat. No. 5,405,565, issued Apr. 11, 1995, to Sumida et al. describes a laminated film comprising an LCP layer through which is laminated a thermoplastic polymer layer which is adhesive to the LCP layer. This composite layer then is laminated onto a thermoplastic polymer layer which is not adhesive to the LCP layer.

The above demonstrates the need for employing LCP, either alone or with a simple tie layer, as a barrier layer on substrate materials for packaging cartons and trays.

None of the above references, take alone or in combination, are seen as teaching or suggesting the presently claimed invention.

SUMMARY OF THE INVENTION

The present invention overcomes the limitations of the above by uniquely incorporating the excellent barrier properties of LCP in carton stock material. A first preferred embodiment of the present invention provides a substrate coated with LCP and, optionally, an intervening tie layer. A second embodiment of the invention provides a surface layer disposed on the LCP layer, sandwiching the LCP layer between the surface layer and the substrate.

In consideration of the above, a first object of the invention is to provide a multi-layer structure having an LCP layer that is adequate for diverse packaging applications.

A second object of the invention is to provide an LCP coated multi-layer structure including a surface layer that is appropriate for food contact.

A third object of the invention is to provide a method for constructing an LCP coated multi-layer structure in furtherance of the above objectives.

A fourth object of the invention is to provide a product formed from an LCP coated multi-layer structure in furtherance of the above objectives.

These and other objects of present invention will become readily apparent upon further review of the following specification and drawings.

Similar reference characteristics denote corresponding features of the invention consistently throughout the attached drawings.

DETAILED DESCRIPTION OF THE PREFERRED EMBODIMENTS

Figure 1:
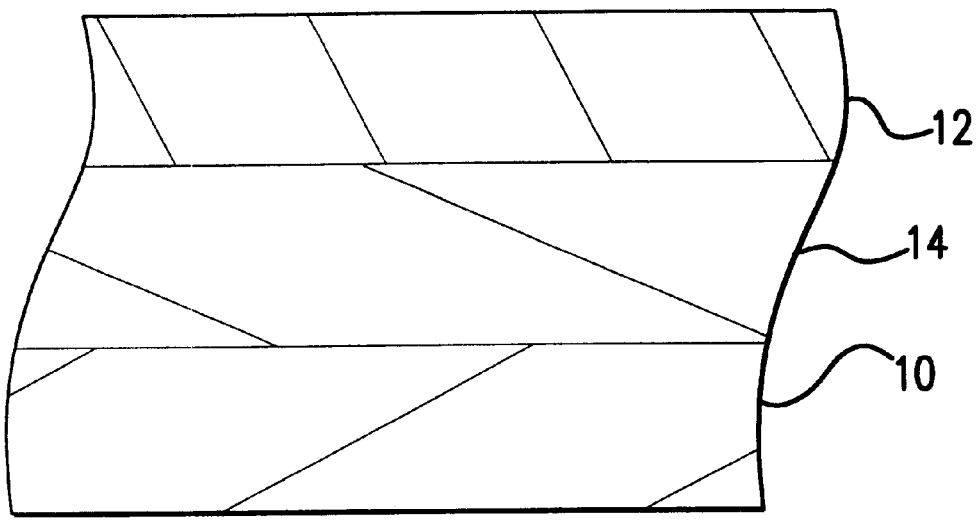
FIG. 1 is a cross-sectional detail view of the layer structure of a first embodiment of the invention.

Referring to FIG. 1, a first embodiment of the present invention includes a substrate 10. The substrate may be selected from any conventional in the industry, such as bleached paper, unbleached paper, bleached paperboard, unbleached paperboard, fiber board, wood, non-woven substrates, polymer films, polymer sheets or combinations thereof.

The invention also includes a liquid crystal polymer (LCP) layer 12 disposed on the substrate 10. The LCP layer may obtain a thickness ranging from 2 to 35 pounds per 3,000 square foot layer. Preferably, the LCP thickness should be in the range from 10 to 20 pounds per 3,000 square feet. The selected LCP may be a wholly aromatic co-polyester, poly benzoate-naphthoate, wholly aromatic co-polyester-amide, polynaphthoate-aminopheno-terephthalate, partially aromatic co-polyester or polyamide.

The invention also may include a tie layer 14 interposed between the substrate 10 and the LCP layer 12. The tie layer may be selected from any material that adheres the paper surface to the LCP layer and may be selected from any of the following: 1,4-cyclohexanedimethanol modified polyethylene terephthalate glycol modified polyester, ethylene-acrylic ester-glycidyl acrylic ester terpolymer, ethylene-acrylic ester copolymer, ethylene-acrylic ester-maleic anhydride terpolymer, ethylene methyl acrylate glycidyl methacrylate terpolymer, ethylene butyl acrylate, co-polyester elastomers and combinations thereof. Other functionalized copolymers and/or specialty copolymers also may be used. The tie layer may obtain a thickness ranging from 2 to 30 pounds, preferably from 5 to 15 pounds, per 3,000 square foot layer.

Due to the high melting point and low surface energy of LCP, it does not adhere well to paper. Accordingly, the most reliable embodiment of the present invention for high-volume production purposes includes a co-extrusion of the LCP and tie layer onto the paper.

The key to obtaining an optimal co-extrusion of LCP and a tie layer is to match the melt viscosities of the LCP with the tie layer compound under extrusion conditions. Typical processing temperatures for LCP range from 525–600° F., whereas those for typical tie layers range from 300–490° F.

Figure 2:
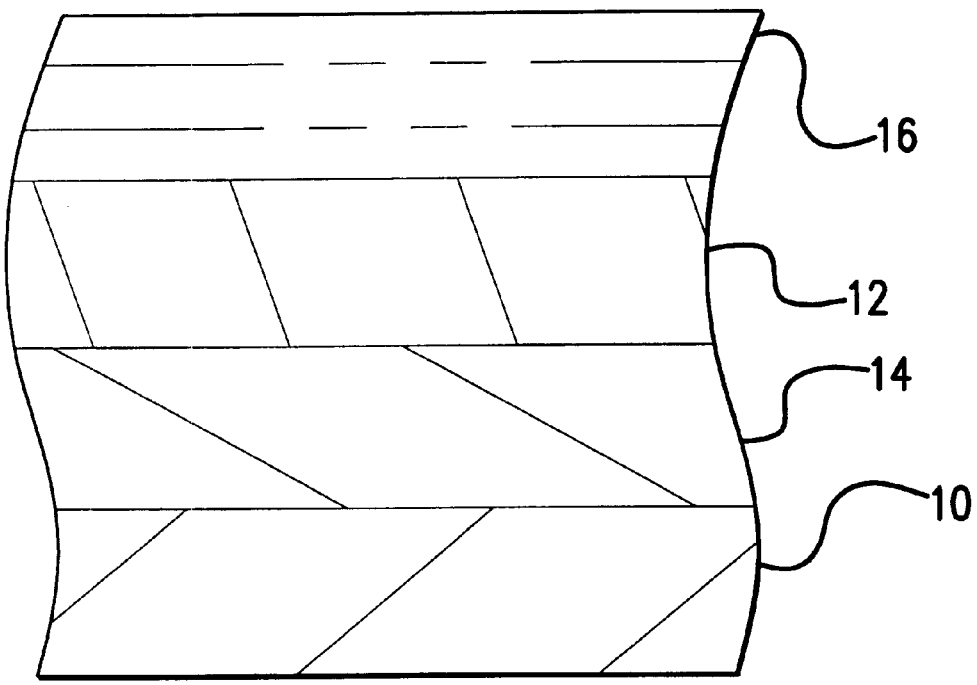
FIG. 2 is a cross-sectional detail view of the layer structure of a second embodiment of the invention.

Referring to FIG. 2, another embodiment of the present invention also may include a surface layer 16 disposed on top of the LCP layer 12. The surface layer may impart many special functionalities to the composite structure, such as printability and heat seal properties. The surface layer may be a pigmented thermoplastic layer or a crosslinkable, polymeric layer. For food packaging, food contact grade materials must be used. In this multi-layer embodiment, the surface layer may obtain the thickness ranging from 4 to 30 pounds per 3,000 square feet. The most preferred coat weight of the tie/LCP layer in this embodiment ranges from 15 to 35 pounds per 3,000 square feet, while the preferred coat weight of the surface layer ranges from 5 to 20 pounds per 3,000 square feet.

Figure 3:
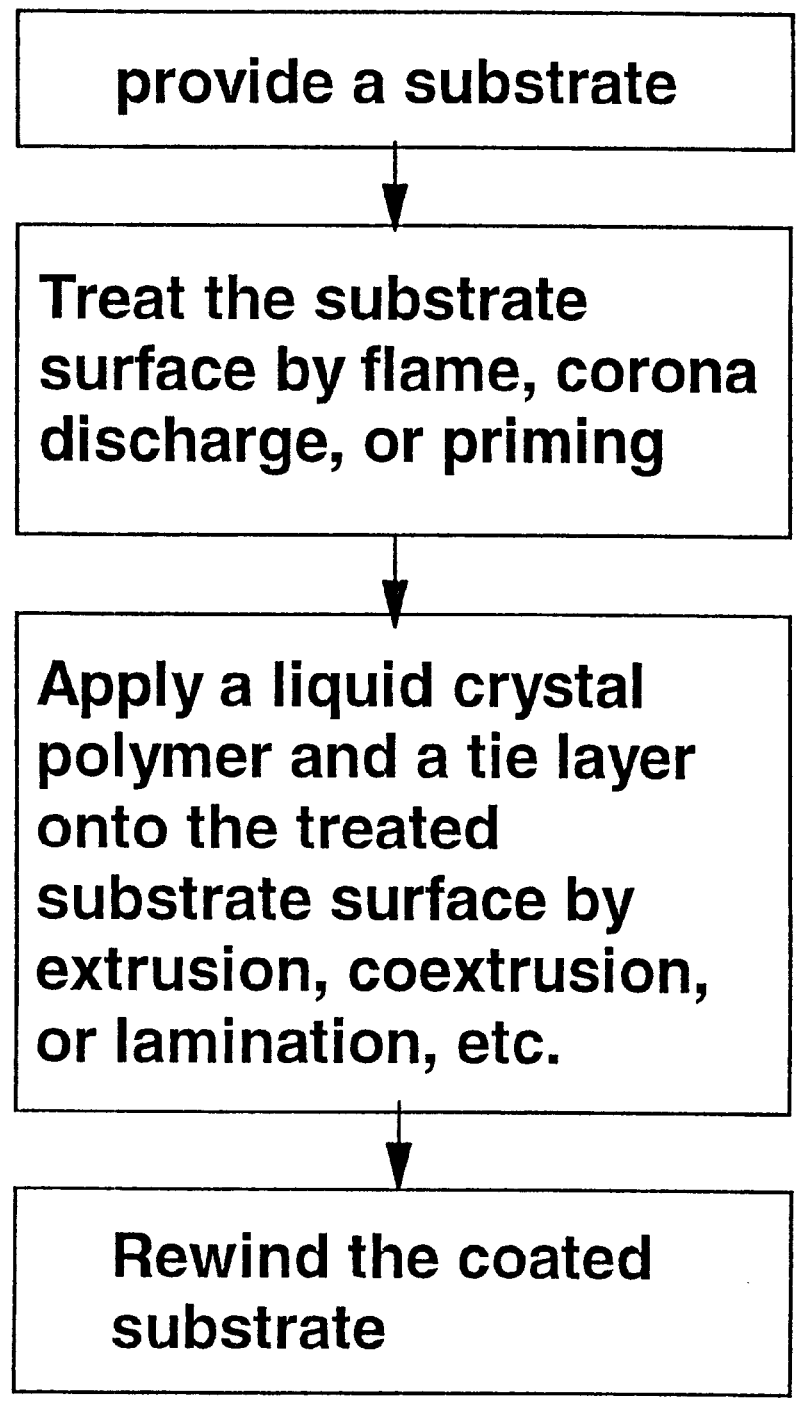
FIG. 3 is a flow chart of a first embodiment of the present method.
Figure 4:
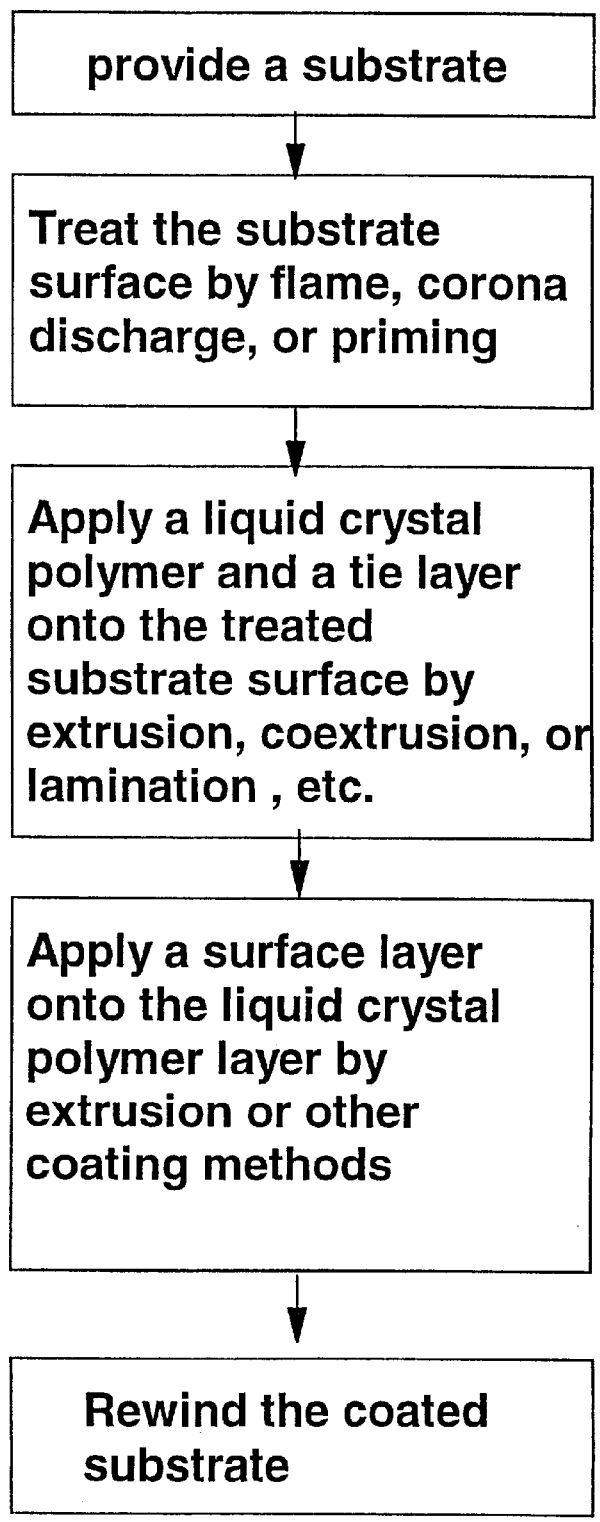
FIG. 4 is a flow chart of alternative embodiments of the present method.
Figure 5:
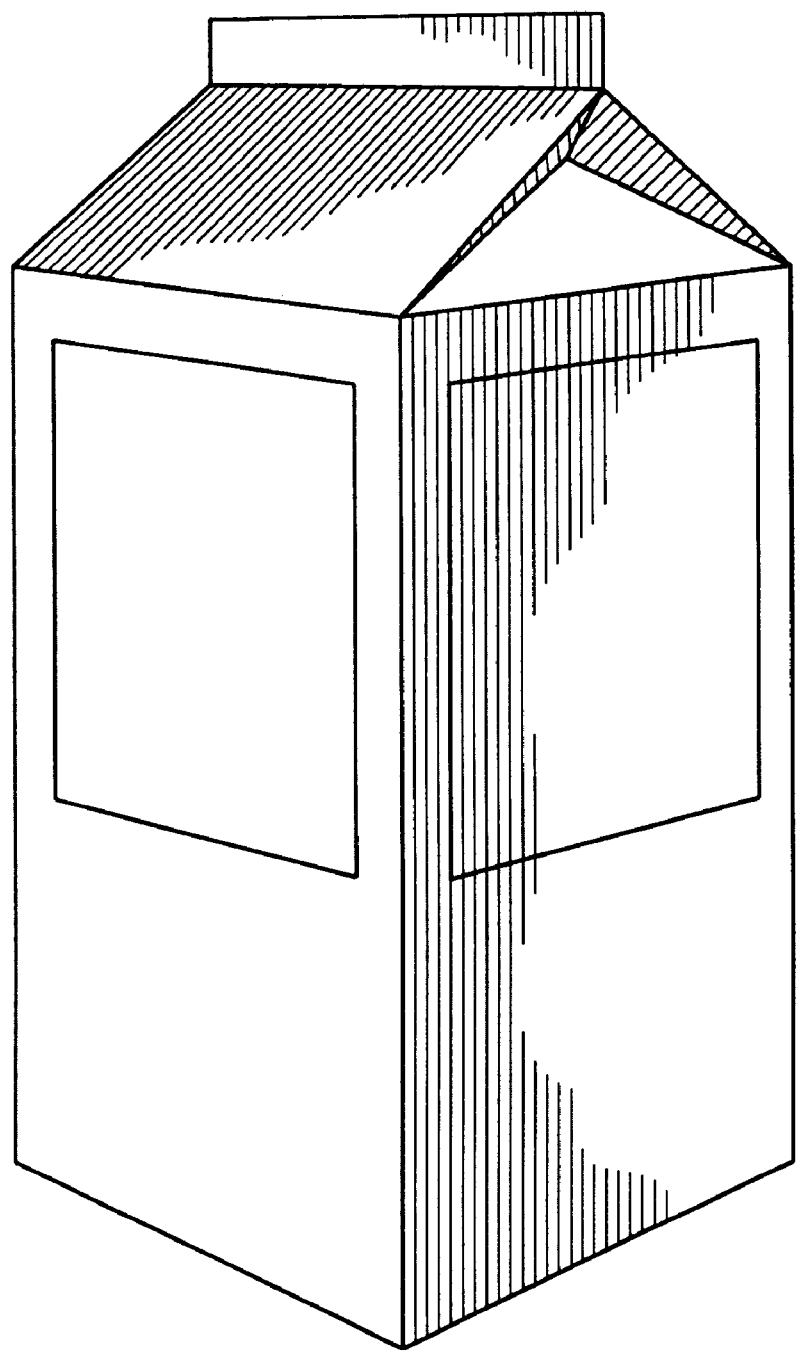
FIG. 5 is a perspective view gable-top carton produced from a laminate embodied by the present invention.
Figure 6:
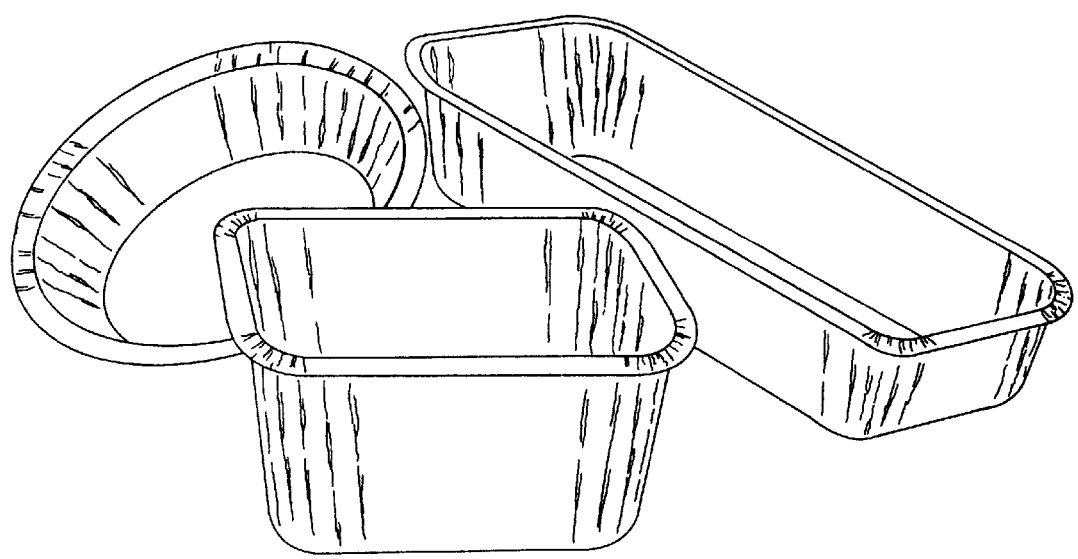
FIG. 6 is an illustration of an ovenable tray made from a laminate embodied by the present invention.

FIGS. 3 and 4 illustrate in block diagram format, methods for producing LCP laminates.

One embodiment of the present method includes the step of treating the surface of the substrate prior to applying any subsequent layer. This surface treatment step renders the substrate surface more amenable to layer adhesion. The step may be accomplished by any method commonly used in the industry, such as flame treating, corona discharge treating, chemical priming and the like. The present method also includes the step of applying an LCP layer with a tie layer, as described above, on the substrate surface. The method used for applying the LCP and tie layers may be selected from, but is not limited to, any method which is well known in the industry, such as co-extrusion, tandem extrusion, lamination, rod coating, curtain coating, spraying, dipping, electrostatic application and combinations thereof. The tie layer enhances adhesion of the LCP layer to the substrate.

Another embodiment of the present method includes the step of applying a LCP layer with a tie layer onto the treated substrate surface in the same way described above.

Yet another embodiment of the present method includes the step of applying a surface layer, as described above, on the LCP layer by extrusion or other coating methods described above.

The present invention is intended to be used to form products. These products include, but are not limited to, packages, cartons and containers. These containers are suitable for, iter alia, liquid dairy products, juices, nectars, sport drinks, edible oil, packaged water, beer, wine, coffee, tea, carbonates, household detergent liquid and liquid soap.

The present invention is not intended to be limited to the embodiments described above, but to include all embodiments commensurate with the scope of the following claims.

We claim:

1. A multi-layer laminate structure for producing a package, carton or container comprising:

a substrate selected from the group consisting of bleached paper, unbleached paper, bleached paperboard, unbleached paperboard, fiber board, wood and combinations thereof; and one or more layers consisting only of a liquid crystal polymer barrier layer coated on said substrate.

2. The multi-layer laminate structure as recited in claim 1, wherein said one or more layers consisting only of a liquid crystal polymer barrier layer is selected from the group consisting of: an aromatic co-polyester-amide; a partially aromatic co-polyester; poly benzoat-naphthoate; polynaphthoate-aminopheno-terephthalate; and combinations thereof.

3. The multi-layer laminate structure as recited in claim 1, wherein said one or more layers consisting only of a liquid crystal polymer barrier layer has a thickness ranging from 2 to 35 pounds per 3,000 square inch.

4. The multi-layer laminate structure as recited in claim 1, further comprising at least one tie layer interposed between said substrate and said one or more layers consisting only of a liquid crystal polymer barrier.

5. The multi-layer laminate structure as recited in claim 4, wherein said at least one tie layer is selected from the group consisting of: 1,4-cyclohexane-dimenthanol modified polyethylene terephthalate glycol modified polyester, ethylene-acrylic ester-glycidyl acrylic ester terpolymer, ethylene-acrylic ester copolymer, ethylene-acrylic ester-maleic anhydride terpolymer, ethylene methyl acrylate glycidyl methacrylate terpolymer, ethylene butyl acrylate, co-polyester elastomers and combinations thereof.

6. The multi-layer laminate structure as recited in claim 4, wherein said at least one tie layer has a thickness ranging from 2 to 30 pounds per 3,000 square feet.

7. The multi-layer laminate structure as recited in claim 1, further comprising at least one surface layer is selected from the group consisting of a thermoplastic layer, a pigmented thermo-plastic layer, a crosslinkable, polymeric layer and blends thereof.

8. The multi-layer laminate structure as recited in claim 7, wherein said at least one surface layer has a thickness ranging from 5 to 20 pounds per 3,000 square feet.

9. A method for manufacturing a multi-layer laminate structure for producing a package, carton or container comprising the steps of:

providing a substrate selected from the group consisting of bleached paper, unbleached paper, bleached paperboard, unbleached paperboard, fiber board, wood and combinations thereof;

treating said substrate with flame, corona discharge or priming; and applying one or more layers consisting only of a liquid crystal polymer barrier layer with a tie layer on said substrate.

10. The method as recited in claim 9, wherein said one or more layers consisting only of a liquid crystal polymer barrier layer is applied with said tie layer by extrusion, co-extrusion, tandem extrusion, lamination, rod coating curtain coating spraying, dipping, electrostatic application or combinations thereof.

11. The method as recited in claim 9, further comprising a step of applying at least one tie layer, interposed between said substrate and said one or more layers consisting only of a liquid crystal polymer barrier layer.

12. The method as recited in claim 11, wherein said at least one tie layer is applied by extrusion, co-extrusion, tandem extrusion, lamination, rod layer, curtain layer, spraying, dipping, electrostatic application or combinations thereof.

13. The method as recited in claim 11, further comprising a step of applying at least one surface layer on said one or more layers consisting only of a liquid crystal polymer barrier layer.

14. The method as recited in claim 9, further comprising a step of surface treating said substrate prior to applying said one or more layers consisting only of a liquid crystal polymer barrier layer on said substrate.

15. The method as recited in claim 14, wherein said step of surface treating said substrate is selected from the group of methods consisting of: flame treating, corona discharge treating, chemical priming and combinations thereof.

16. The method as recited in claim 11, further comprising a step of surface treating said substrate prior to applying said at least one tie layer on said substrate.

17. The method as recited in claim 16, wherein said step of surface treating said substrate is selected from the group of methods consisting of: flame treating, corona discharge treating, chemical priming and combinations thereof.

18. A product formed from a multi-layer laminate structure as recited in claim 1.

19. A product formed from the multi-layer laminate structure produced by the method recited in claim 9.

* * * * *